United States Patent [19]
Jennings

[11] Patent Number: 5,559,969
[45] Date of Patent: Sep. 24, 1996

[54] METHOD AND APPARATUS FOR EFFICIENTLY INTERFACING VARIABLE WIDTH DATA STREAMS TO A FIXED WIDTH MEMORY

[75] Inventor: Kevin F. Jennings, Novi, Mich.

[73] Assignee: Unisys Corporation, Blue Bell, Pa.

[21] Appl. No.: 287,880

[22] Filed: Aug. 9, 1994

[51] Int. Cl.$^6$ ............................................. G06F 13/38
[52] U.S. Cl. ............................................ 395/307; 395/306
[58] Field of Search ..................................... 395/307, 306

[56] References Cited

U.S. PATENT DOCUMENTS

| | | | |
|---|---|---|---|
| 4,309,754 | 1/1982 | Dinwiddie, Jr. | 395/307 |
| 4,595,911 | 6/1986 | Kregness et al. | 340/347 |
| 4,716,527 | 12/1987 | Graciotti | 395/307 |
| 4,860,198 | 8/1989 | Takenaka | 395/307 |
| 4,878,166 | 10/1989 | Johnson et al. | 395/307 |
| 5,195,185 | 3/1993 | Marenin | 395/325 |
| 5,202,966 | 4/1993 | Woodson | 395/325 |
| 5,255,374 | 10/1993 | Aldereguia et al. | 395/307 |
| 5,255,375 | 10/1993 | Crook et al. | 395/325 |
| 5,255,378 | 10/1993 | Crawford et al. | 395/307 |
| 5,388,227 | 2/1995 | McFarland | 395/307 |

*Primary Examiner*—Jack B. Harvey
*Assistant Examiner*—David A. Wiley
*Attorney, Agent, or Firm*—Nawrocki, Rooney & Sivertson, P.A.

[57] ABSTRACT

An apparatus for and method of providing a system whereby a number of processors may communicate with a memory device and wherein the memory device may operate at a slower speed without substantially reducing the band pass of the computer system. Further, one or more of the processors may have a different data word width from the other processors and from the memory device. The present invention may minimize the amount of wasted memory bits contained therein by concatenating data words such that the resulting data word substantially matches the word width of the memory device. The present invention further allows predefined portions of a data word to be placed in an order and concatenated with predefined portions of the same data word or with predefined portions of other data words. A number of predetermined formats define the selection and the order that the predefined portions may be placed. Various formats are contemplated and are described herein.

62 Claims, 10 Drawing Sheets

| | WORD-Z | DESCRIPTION |
|---|---|---|
| FORMAT-1 | WORD-1 | FROM MOST SIGNIFICANT WORD TO LEAST SIGNIFICANT WORD |
| | WORD-2 | |
| | WORD-3 | |
| | WORD-4 | |
| FORMAT-2 | WORD-4 | FROM LEAST SIGNIFICANT WORD TO MOST SIGNIFICANT WORD |
| | WORD-3 | |
| | WORD-2 | |
| | WORD-1 | |
| FORMAT-3 | WORD-# | WORD-# = ANY ONE WORD |
| FORMAT-4 | WORD-\\ | WORD-\\ = ONLY WORDS ON EITHER AN EVEN OR AN ODD 16 BIT BOUNDARY |

FIG. 2C 5,559,969

METHOD AND APPARATUS FOR EFFICIENTLY INTERFACING VARIABLE WIDTH DATA STREAMS TO A FIXED WIDTH MEMORY

CROSS REFERENCE TO CO-PENDING APPLICATIONS

The present application is related to U.S. patent application Ser. No. 08/287,878, filed Aug. 9, 1994, entitled "Method and Apparatus for High Speed Efficient Bi-Directional Communication Between Multiple Processors Over a Common Bus", and U.S. patent application Ser. No. 08/287,879, filed Aug. 9, 1994, now U.S. Pat. No. 5,517,504, entitled "Method and Apparatus for High-Speed Implementation of Scaling, Dithering, and Data Remapping Operations with a Single Processor", both assigned to the assignee of the present invention and both incorporated herein by reference.

BACKGROUND OF THE INVENTION

1. Field of the Invention

The present invention generally relates to general purpose digital data processing systems and more particularly relates to such systems that employ a common bus architecture.

2. Description of the Prior Art

In many general purpose, stored program, digital computers, it is desirable to have at least one shared resource contained therein. Each of the shared resources may be designed to service a number of user. In the context of the present invention, the shared resource may comprise a common bus. The common bus may be connected to a number of processors or the like such that communication between the processors can be made over the common bus.

A problem with using a common bus architecture is that the common bus may reduce the band pass of a system if not carefully used and designed. One reason for this is that only one of the users may be granted access to the common bus at any given time. That is, the users must "share" the resource.

One method for increasing the overall band pass of a common bus architecture is to utilize a priority scheme. Often, one or more of the processors that is connected to the common bus has a greater need to access the common bus than other processors connected thereto. For example, one of the processors may be in the critical path of the computer system. Priority schemes attempt to grant access to the processor that is in the critical path of the computer system over all other processors.

Although a priority scheme may increase the band pass of a given computer system, an underlying problem with the common bus approach still remains. That is, certain users within the computer system may operate at a slower rate than the other users and therefore the slower users may limit the band pass of the computer system. This may occur despite having a priority system implemented therein. One situation where this may occur is when the data format of a "sending" user may not be in an optimum format for use by a "receiving" user. For example, a sending user may impose data having a single precision data format where the receiving user may require a double precision data format or visa-versa. When this occurs, the receiving user may have to reformat the data before performing arithmetic operations thereon, thereby limiting the band pass of the receiving user. Accordingly, the data formatting function may be very time critical, and must be performed at the highest rate possible while maintaining accuracy.

A proposed solution to this problem is addressed in U.S. Pat. No. 4,595,911, issued on Jun. 17, 1986, to Kregness et al. Kregness et al. suggests employing dedicated circuitry to perform the reformatting function. The dedicated circuitry includes a number of programmable ranks of multiplexers for reformatting the data from a programmable selected first format to a programmable selected second formats. However, Kregness et al. only contemplates reformatting the data to increase the speed of a corresponding arithmetic operation. Also, Kregness et al. only suggests "reformatting" data wherein both the input data and the output data have a common word width.

For shorthand purposes only, the present disclosure refers to an interface with a "common bus". However, it is recognized that the "bus" may have a number of components (such as a memory device) coupled thereto. Therefore, what is really disclosed is an interface with a component which is coupled to the bus.

Another situation where certain users within a computer system may limit the band pass of the computer system is when a plurality of high speed users require access to a slower shared resource. An example of this is when a number of high speed processors require access to a slower memory device. High speed processors are typically pipelined or otherwise designed to require little processing between registers, thereby allowing a high clock rate and high throughput. Memory devices, on the other hand, typically must perform a substantial amount of processing during each memory access. For example, for a read operation, a Random Access Memory (RAM) must typically decode the address lines, precharge the bit lines, wait for the memory cells to discharge the bit lines into a corresponding state, sense the resulting state of the bit lines, and output the data. For a write operation, a RAM must typically decode the address lines, precharge the bit lines, force the bit lines into a state that is consistent with the data inputs of the RAM, and wait for a predetermined "write" time to ensure the corresponding memory cells have been written to the proper state.

Because of this inherent incompatibility between high speed processors and memory devices, a system that requires a memory device such as a RAM to service high speed processors may be problematic and limit the band pass of the computer system. This problem is exacerbated when a number of high speed processors are coupled to the memory device over a common bus wherein the memory device must service all of the high speed processors. In this situation, the memory device may be in the critical path of the computer system every time any of the high speed processors access the memory.

Another problem that may occur in system utilizing a common bus is that each processor may employ a different width data word. That is, one processor may only require an eight bit data word while another processor may require a sixteen or thirty-two bit data word. This may create problems when the respective processors utilize a common memory device. One solution to this problem is to provide a memory that has a data word width that is sufficient to accommodate the widest data word that is coupled to the common bus. However, this solution has several disadvantages. One disadvantage is that if a processor requiring an eight bit data word writes into a memory location having a sixteen bit data word width, eight of the sixteen bits at that memory location are squandered. Further, each access to the memory device by any one of the processors may require the processor to wait one full memory cycle, which may be substantially longer than the processors clock cycle.

Yet another problem that may occur as a result of having processors that utilize different data word widths is that the processors may not be able to effectively communicate between one another. That is, one processor that has an eight bit data word may need to communicate with a processors that has a thirty-two bit data word. One solution to this problem is to provide the eight bit data word from a first processor into the least significant eight bits of the thirty-two bit data word of a second processor. Similarly, the most significant bits of the thirty-two bit data word of the second processor may be provided to the eight bit data word of the first processor wherein the remaining twenty-four bits of the thirty-two bit data word are discarded. These solutions are simple but very limiting in their application.

SUMMARY OF THE INVENTION

The present invention overcomes many of the disadvantages of the prior art by providing a system whereby a number of processors may communicate with a memory element and wherein the memory element may operate at a lower speed without substantially reducing the band pass of the computer system. Further, one or more of the processors may have a different data word width from the other processors and from the memory element. The present invention may minimize the amount of wasted memory bits contained in the memory element by concatenating data words such that the resulting data word substantially matches the word width of the memory element. The present invention also allows predefined portions of a data word to be placed in an order and concatenated with predefined portions of the same data word or with predefined portions of other data words. A number of programmable data formats define the selection and order that the predefined portions may be placed. Various formats are contemplated and some of these formats are described herein.

Another advantage of some of the formatting algorithms described herein is that data fields that span byte boundaries may be efficiently processed. That is, the formatting algorithm of the present invention allows the selection of data fields that span byte boundaries and allow communication thereof to an appropriate user. Further, some of the formatting algorithms allow the previewing of wider data words before discarding a portion thereof when communicating with a processor having a narrower data word.

The present invention may also allow a data word having a data word width that is less than the data word width of the corresponding memory element to be written to or read from the memory element without disturbing the remaining bits at the corresponding address location of the memory element. That is, for those data formats that do not write to all of the bits of a particular memory location, an exemplary embodiment of the present invention may allow only the specific bits of the formatted data word to be written to the particular memory location in one memory cycle. Conventional schemes typically require that the previous data must be read from the memory location, then the previous data must be masked out and the new data bits placed therein, and finally the resulting memory word must then written back into the corresponding memory location. Even assuming no overhead for the masking operation, the two memory accesses of the conventional schemes double the amount of memory bandwidth consumed over the present invention.

In an exemplary embodiment of the present invention, a number of processors are coupled to a first bus. The first bus may be a high speed bus thereby allowing high speed transmission between any two processors that are attached thereto. Each processor that is coupled to the first bus may require a different number of data bits to comprise a full data word.

A number of memory devices may be coupled together via a second bus. The second bus may operate at a lower speed than the first bus such that slower memory accesses may be made over the second bus. As stated above, typical memory devices may not operate at the same speed as high speed processor devices. In the exemplary embodiment, the first bus may operate at twice the frequency of the second bus. To compensate for this frequency differential, it is contemplated that the second bus may have a data width that is twice as wide as the first bus. The significance of the speed/width relationship between the first bus and the second bus will be discussed further infra. It is contemplated that other speed/width ratios fall within the scope of the present invention.

A memory processor may provide an interface between the first bus and the second bus. Since the second bus may be twice as wide as the first bus, it is possible to concatenate two data words provided by the processors into a single memory word that may be transferred across the second bus and stored in one of a number of memory devices. Further, since the first bus may operate at twice the frequency of the second bus, the first bus may supply two data words for every bus cycle of the second bus. The memory processor of the present invention may thus receive two data words from the first bus, concatenate them together, and send the result to a memory element during the next succeeding cycle of the second bus. Similarly, the memory processor of the present invention may retrieve a 32 bit memory word from a memory element, produce two 16 bit data words, and transfer the resulting two data words across the first bus during the next two succeeding bus cycles of the first bus. The memory processor may thus effectively double the band pass of the memory device thereby substantially removing the memory device from the critical path of the computer system.

In another embodiment of the memory processor of the present invention, each of the data words supplied by the processors may be divided into predefined sub-portions. The individual sub-portions of a data word may then be re-ordered in a predetermined way before they are concatenated together to form a corresponding memory word. This is known as formatting the data word. Exemplary formats include ordering the data word from the least significant byte to the most significant byte and from the most significant byte to the least significant byte. It is further contemplated that the formatting function may also include any one byte from the data word or only include bytes on either an even or an odd 16 bit word boundary. It is recognized that these are only exemplary formats and other formats, including those not drawn along byte boundaries, are within the scope of the present invention. Further, it is contemplated that the formatted data word may only include one or more predefined sub-portions of the original data word. After formatting is complete, the resulting bytes are concatenated together to form a memory word that is then sent across the second bus and stored into memory. The present embodiment contemplates applying the same formatting techniques to the memory words as they are read from memory. Hence, the individual bytes of the memory word may be re-ordered in a way that is consistent with the formatting functions described above.

In yet another embodiment of the present invention, an input buffer may be included in the memory processor such that the processors may transmit data words across the first bus to the memory processor before the memory processor has gained control of the second bus. This eliminates the need for a processor to maintain control of the first bus for an unnecessarily long period of time while waiting for the data to be stored into the memory device. That is, the input buffer may act as a data cache between the first bus and the second bus. Similarly, an output buffer may be included in the memory processor such that the memory elements may transmit memory words across the second bus to the memory processor before the memory processor has gained control of the first bus. This eliminates the need for a memory device to maintain control of the second bus for an unnecessarily long period of time while waiting for the data to be read by the processors. That is, the output buffer may act as a data cache between the second bus and the first bus.

It is contemplated that the input buffer and output buffer described above may also be used to provide a number of data words to the formatting function. That is, the input buffer and the output buffer may store the current data word and the last "N" data words. Hence, not only may predefined sub-portions from a single data word be formatted pursuant to the formatting function described above, but sub-portions from different data words may be used therein. For example, a memory word may be defined as the most significant byte of the previous four data words. This formatting function may be especially useful in image processing applications.

In another embodiment of the present invention, a number of separate memory devices may be used to store the memory words. Each of the number of memory devices may store one sub-portion of the memory word. In the exemplary embodiment, the address lines for all of the separate memory devices may be coupled to a corresponding one of the address lines on the other memory devices. Further, a separate enable line may be provided to each memory device. Configured in this way, each byte of a multi-byte memory word may be stored in a unique memory device wherein all of the bytes of the multi-byte memory word are stored at the same address location as specified by the common address lines. By manipulating the enable lines of each memory device, a single byte of the memory word may be stored in a corresponding memory element. This may be accomplished without disturbing the remaining data bytes at that same address location. This architecture may effectively double the band pass of the memory device during write operations when only a portion of the memory word is to be written to the memory element. As previously stated, a conventional system typically needs to read the previous data from the memory location, mask out the previous data and place the new data bits therein, and finally writes the resulting memory word back into the memory location. Even assuming no overhead for the masking operation, the two memory accesses effectively double the amount of memory bandwidth consumed over the present invention.

As stated above, the interface between the first bus and the second bus may be controlled by a memory processor. The memory processor may be independently programmed for various data transfer algorithms. For example, the memory processor may be programmed to implement a block move instruction whereby any of the processors that are coupled to the first bus may request to read a block of data from the memory element. The memory processor may then supply the requesting processor with the requested block of data in a manner that is consistent with the present invention. That is, the memory processor may read the data from the memory element, format the data in accordance with the desired format algorithm, and provide the result to the requesting processor. In a similar manner, any processor that is coupled to the first bus may request to write a block of data to the memory device. It is contemplated that the memory processor may have independent read and write access ports such that a block read and a block write may be performed simultaneously. One application for this capability is for a processor to perform a block read and process the information as it is read from the memory element. The processor may then supply the resulting data to the memory processor as a block write thereby storing the result back into a memory element. During both the block read and the block write, the memory processor may format the data as desired.

Another exemplary transfer algorithm that may be programmed into the memory processor is a memory-to-memory transfer instruction. The memory-to-memory transfer instruction may read a block of data from the memory device, format the data, and then write the resulting data back into the memory device. The resulting data may be written back into the same address location as the data was read from or into a different address location. This instruction may allow efficient memory-to-memory transfers.

It is contemplated that both the first bus and the second bus may be controlled by an apparatus as described in co-pending, commonly assigned U.S. Patent Application entitled "Method and Apparatus for High Speed Efficient Bi-Directional Communication Between Multiple Processors Over a Common Bus" that is expressly incorporated herein by reference. It is further contemplated that at least one of the processors that is coupled to the first bus may include the apparatus described in the co-pending, commonly assigned U.S. Patent Application entitled "Method and Apparatus for High-Speed Implementation of Scaling, Dithering, and Data Remapping Operations with a Single Processor" that is also expressly incorporated herein by reference.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2A is a diagram illustrating exemplary formatting algorithms that may be performed by a preferred embodiment of the present invention; FIG. 2B and FIG. 2C are charts that further defining the various formatting algorithms shown in FIG. 2A;

DETAILED DESCRIPTION OF THE PREFERRED EMBODIMENTS

Figure 1:
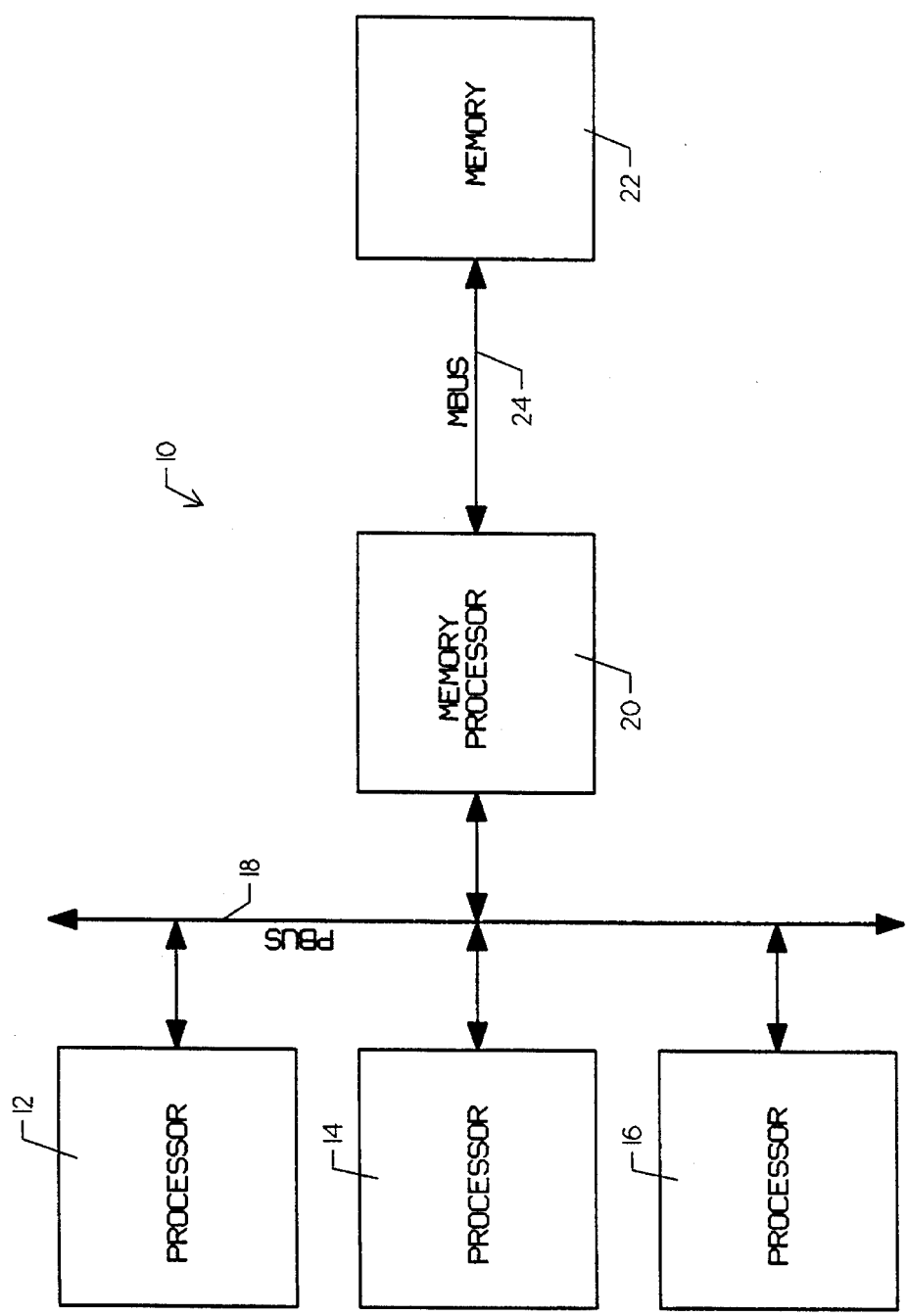
FIG. 1 is a schematic diagram illustrating an exemplary configuration of the present invention.

FIG. 1 is schematic diagram illustrating an exemplary configuration of the present invention. The embodiment is generally shown at 10 and comprises a processor bus (PBUS) 18 and a memory bus (MBUS) 24. PBUS 18 may be coupled to processors 12, 14 and 16. PBUS 18 may be a high speed communication bus between any two of the processors connected thereto. Each of the processors 12, 14 and 16 may require a different number of data bits to comprise a full data word. In a preferred embodiment, each of the processors 12, 14 and 16 may have either an 8-bit data word or a 16-bit data word. It was determined that both of these data word widths were required to achieve maximum system performance in the preferred mode. It is recognized that other data word widths may be utilized and still be within in the scope of the present invention.

A memory processor 20 may be coupled to PBUS 18 and thus may communicate with processors 12, 14 and 16. Memory processor 20 may be coupled to a memory element 22 via MBUS 24. MBUS 24 may operate at a lower speed than PBUS 18. This may be required because memory element 22 may not operate at the same speed as processors 12, 14 and 16. Processors 12, 14 and 16 may be high speed processors which utilize a pipelined architecture or are otherwise designed to require little processing between registers, thereby allowing a high clock rate and high throughput. To facilitate this high throughput, PBUS 18 may be a high speed data bus. Memory devices, on the other hand, typically must perform a substantial amount of processing during each memory access. For example, for a read operation, a random access memory must typically decode the address lines, precharge the bit lines, wait for the memory cells to discharge the bit lines into a corresponding state, sense the resulting state of the bit lines, and output the data. For a write operation, a RAM must typically decode the address lines, precharge the bit lines, force the bit lines into a state that is consistent with the data inputs of the RAM and wait for a predetermined "write" time to ensure the corresponding memory have been written to the proper state. Therefore, there may be an inherent incompatibility between the speeds of processors 12, 14 and 16 and memory element 22. Therefore, MBUS 24 may operate at a lower speed than PBUS 18 such that the slower memory accesses may be made over MBUS 24.

In an exemplary embodiment, PBUS 18 may operate at twice the frequency of MBUS 24. To compensate for this frequency differential, it is contemplated that MBUS 24 may have a data width that this twice as wide as PBUS 18. In the exemplary embodiment, MBUS 24 may have a bus width of 32 bits and PBUS may have a bus width of 16 bits. Memory element 24 may also have a 32 bit data word to be consistent with MBUS 24. It is recognized that other combinations of speed and width may be used and still be within the scope of the present invention.

Memory processor 20 provides an interface between PBUS 18 and MBUS 24. Since PBUS 18 may be twice as wide as MBUS 24, it is possible to concatenate two data words provided by processors 12, 14 or 16 into a single memory word. The resulting data word may then be transferred across MBUS 24 and stored in memory element 22. Further, since PBUS 18 may operate at twice the frequency of MBUS 24, PBUS 18 may supply two data words for every bus cycle of MBUS 24. Memory processor 20 may thus receive two data words from PBUS 18, concatenate them together, and send the result to memory element 22 during the next succeeding cycle of MBUS 24. In a similar way, memory processor 20 may retrieve a 32 bit memory word from memory element 22, produce two 16-bit data words, and transfer the resulting two data words across PBUS 18 during the next two succeeding bus cycles of PBUS 18. Memory processor 20 may thus effectively double the band pass of memory element 22 thereby substantially removing memory element 22 from the critical path of the computer system.

In another embodiment of memory processor 20, each of the data words supplied by processors 12, 14 and 16 may be divided into bytes. The individual bytes of a data word may be then be re-ordered in a predetermined way before they are concatenated together to form a corresponding memory word. This is known as formatting the data word. Exemplary formats include ordering the data bytes from the least significant byte to the most significant byte and from the most significant byte to the least significant byte. It is further contemplated that the formatting function may include any one byte from the data word or only include bytes on either an even or an odd 16-bit word boundary. It is recognized that these are only exemplary formats and other formats are contemplated. After formatting is complete, the resulting bytes may be concatenated together to form a memory word. The memory word may then be sent across MBUS 24 and stored in memory element 22. It is contemplated that the same formatting techniques may be applied to the memory words as they are read from memory element 22. Hence, the individual bytes of the memory word may be re-ordered in a way that is consistent with the reformatting functions described herein. Further, it is contemplated that different formatting algorithms may be selected for data entering and leaving the memory processor. That is, the formatting algorithm may be independently selected for the PBUS to MBUS path and for the MBUS to PBUS path within the memory processor. This includes having, for example, 8 bit bytes going from PBUS 18 to MBUS 24 while having 16 bit words going from MBUS 24 to PBUS 18.

It is further contemplated that the formatting function does not need to respect byte boundaries. The formatting function may be programmed in any manner desired by the user. It is contemplated that any number of processors may be coupled to PBUS 18 and that any number of memory elements may be coupled to MBUS 24. Finally, it is contemplated that any number of memory processors may be coupled to PBUS 18 and MBUS 24.

Figures 2A, 2B:
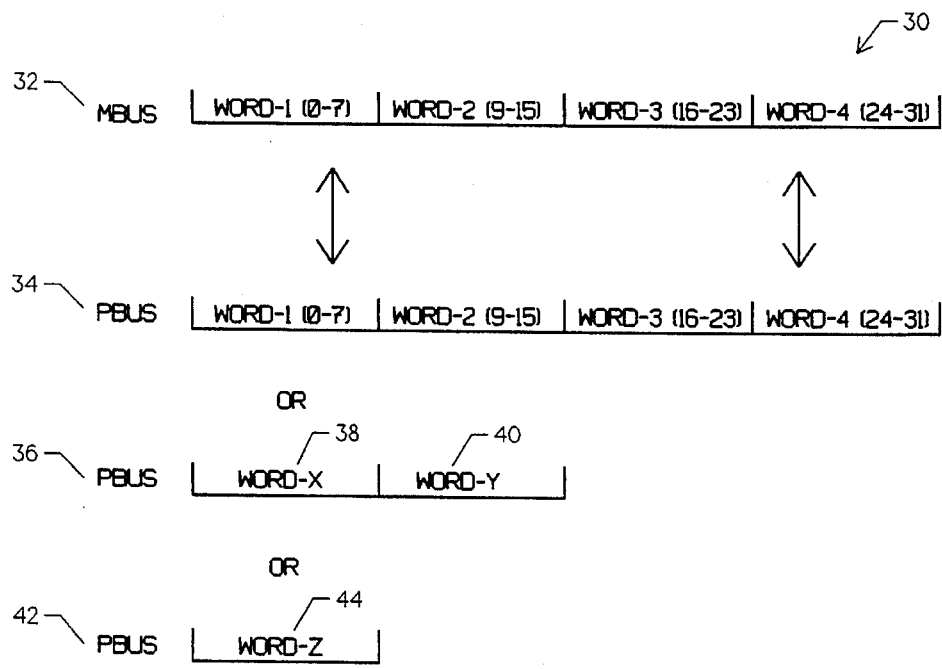

FIG. 2A is a diagram illustrating exemplary formatting algorithms that may be performed by a preferred embodiment of the present invention. Exemplary formatting algorithms for a read operation are generally shown at 30. During a single read cycle, memory element 22 may provide 32 bits of data onto MBUS 24. The format of the data provided by memory element 22 onto MBUS 24 is generally shown at 32. The 32-bit memory word may comprise four 8-bit data words with word-1 being the most significant data word and word-4 being the least significant data word. The formatting algorithm provided by memory processor 20 depends upon the corresponding data width of PBUS 18. If PBUS 18 has a data width equal to MBUS 24, no formatting is required as shown at 34. However, it is contemplated that formatting may be performed even when the width of PBUS 18 equals the width of MBUS 24.

If the data width of PBUS 18 is only half as wide as MBUS 24, memory processor 20 may format the data contained on MBUS 24 as shown at 36. The resulting data word on PBUS 18 may comprise word-X 38 and a word-Y 40. The definition of word-X 38 and word-Y 40 is further described in FIG. 2A. Note that it may require two bus cycles of PBUS 18 to transfer all four data words contained on MBUS 24.

Finally, if PBUS 18 is only 8-bits wide, the formatting algorithm of memory processor 20 is shown at 42. During each bus cycle of PBUS 18, a word-Z 44 is transferred thereon. A further description of word-Z 44 is contained in FIG. 2C. Note that it may require four PBUS cycles to transfer the data contained on MBUS 24. It is contemplated that only one (or more) of the four words may be transferred across PBUS 18. The formatting function may select which of the four words to transmit across PBUS. The formatting function may also select which bus cycle of PBUS 18 to transmit the single data word.

FIG. 2B is a diagram further defining word-X 38 and word-Y 40 for various exemplary data formats of PBUS 36. The various formats are generally shown at 50. A Format-1 52 transmits memory word 52 from the most significant word to the least significant word. That is, during the first bus cycle of PBUS 18, word-1 and word-2 are transmitted to a corresponding processor. During the second bus cycle of PBUS 18, word-3 and word-4 are transmitted to the corresponding processor. A Format-2 54 transmits the memory word contained on MBUS 24 from the least significant word to the most significant word. That is, during a first bus cycle of PBUS 18, word-4 and word-3 are transmitted to a corresponding processor. During a second cycle of PBUS 18, word-2 and word-1 are transmitted to the corresponding processor. A Format-3 56 shows that the memory word on MBUS 24 may be transmitted in any predefined order. That is, during a first cycle of PBUS 18, a word-MSB 62 and a word-LSB 64 may be transmitted to a corresponding processor. In addition, during the second bus cycle of PBUS 18, a second word-MSB 62 and a second word-LSB 64 may be transmitted to the corresponding processor.

Word-MSB 62 and word-LSB 64 are further defined in the table shown generally at 68. For example, during a first bus cycle of PBUS 18, word-MSB 62 may comprise word-3 of the data contained on MBUS 24 and word-LSB 64 may comprise word-1 of the data word contained on MBUS 24. This is shown at 70. During the second bus cycle of PBUS 18, word-MSB 62 may comprise word-1 of the data word contained on MBUS 24 and word-LSB 64 may comprise word-3 of the data word contained on MBUS 24. This is shown at 72. Therefore, it is contemplated that any combination of word-MSB 62 and word-LSB 64 may be programmed in memory controller 20.

FIG. 2C is a diagram further defining word-Z 44 of FIG. 2A. The definition of word-Z 44 is generally shown at 90. A Format-1 92 contemplates transmitting the four 8-bit data words contained on MBUS 24 from the most significant word to the least significant word. That is, during a first bus cycle of PBUS 18, word-1 is transmitted to a corresponding processor. During a second cycle of PBUS 18, word-2 may be transmitted to the corresponding processor. During a third cycle of PBUS 18, word-3 may be transmitted to the corresponding processor. Finally, during a fourth cycle of PBUS 18, word-4 may be transmitted to the corresponding processor.

A Format-2 94 contemplates transmitting each of the 8-bit data words contained on MBUS 24 from the least significant word to the most significant word. That is, during a first bus cycle of PBUS 18, word-4 may be transmitted to a corresponding processor. During a second bus cycle of PBUS 18, word-3 may be transmitted to the corresponding processor. During a third cycle of PBUS 18, word-2 may be transmitted to the corresponding processor. Finally, during a fourth cycle of PBUS 18, word-1 may be transmitted to the corresponding processor.

A Format-3 96 contemplates transmitting any one 8-bit word contained in MBUS 24 that the user desires. That is, during a first bus cycle of PBUS 18, any one of the four words may be transmitted to a corresponding user. During the second, third, and fourth bus cycles of PBUS 18, the remaining words may be set to zero or other predefined value. It also contemplated that the selected word may be transmitted during a selected bus cycle of PBUS 18. That is, the selected word may be transmitted during the third bus cycle of PBUS 18 rather than during the first bus cycle. Memory processor may be programmed by the user to define which words are transmitted during the various PBUS cycles.

A Format-4 98 contemplates transmitting only 8-bit words that reside on either an even or an odd 16-bit boundary of MBUS 24. That is, word-\\ 102 represents any of the words contained on MBUS 24 that are either on an even or odd 16-bit boundary.

Figure 3:
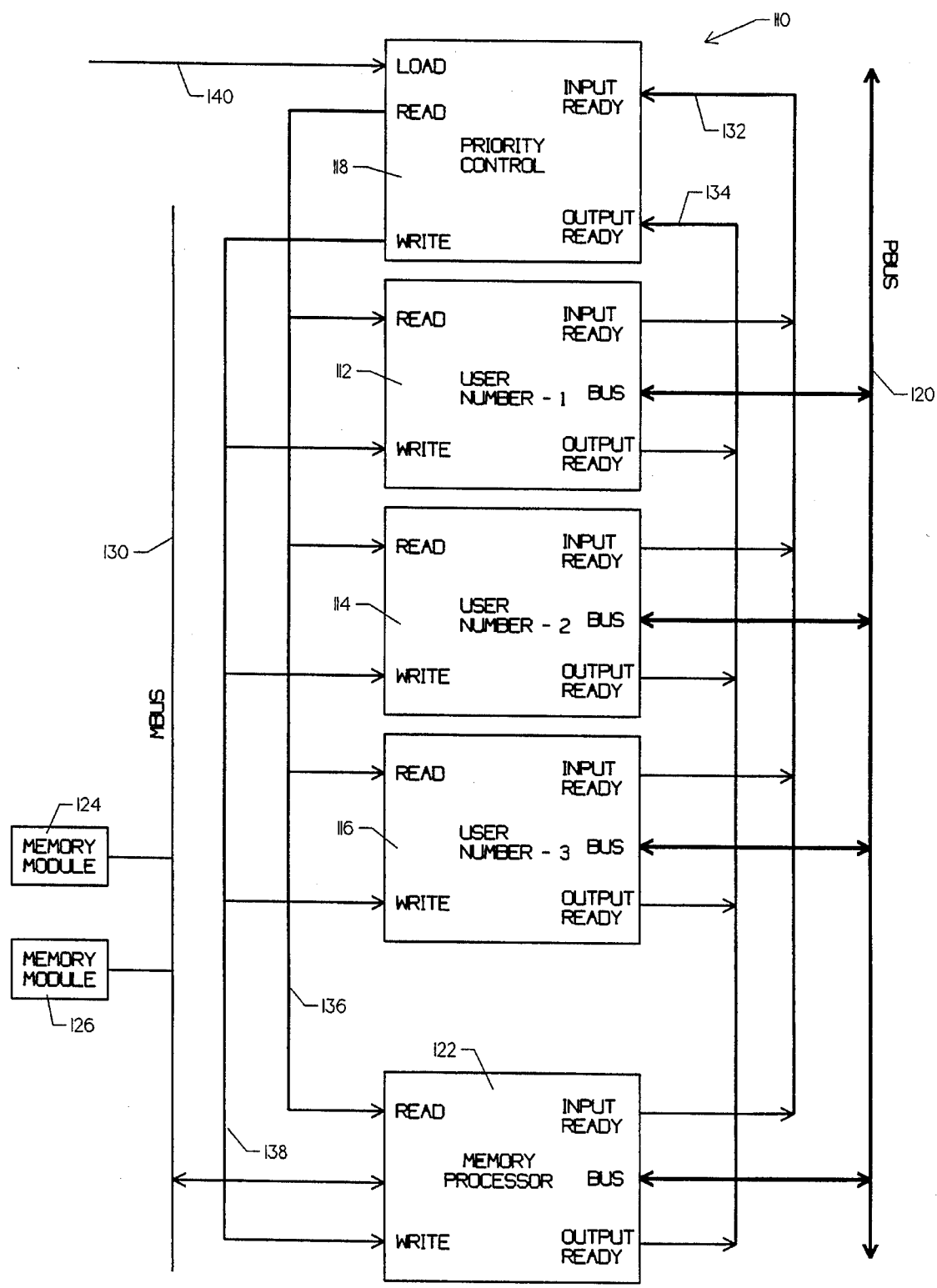
FIG. 3 is a schematic diagram illustrating an exemplary implementation of the memory processor of FIG. 1 and FIG. 3.

FIG. 3 is a schematic diagram illustrating an exemplary implementation of the present invention. Processors 112, 114 and 116 are all coupled to PBUS 120 wherein each processor may communication with the others over PBUS 120. In a preferred embodiment, processors 112, 114 and 116 are high speed data processors and PBUS 120 is a high speed data bus. A memory processor 122 is coupled to PBUS 120 thereby allowing memory processor 122 to communicate with processors 112, 114 and 116. Memory processor 122 is further coupled to MBUS 130. A memory module 124 and a memory module 126 may also be coupled to MBUS 130. Memory processor 122 is capable of communicating with memory modules 124 and 126 via MBUS 130. In a preferred embodiment, MBUS 130 operates at one-half the frequency of PBUS 120. However, MBUS 130 has a data width that is twice as wide as PBUS 120. As previously stated, memory modules 124 and 126 may operate at a lower speed than processors 112, 114 and 116.

PBUS 120 must be shared by processors 112, 114 and 116. One method for increasing the overall band pass of a shared resource design is to utilize a priority scheme. In a typical system, a number of processors may communicate with each other across a shared bi-directional bus. However, only one processor may use the shared bus at any given time. Therefore, the computer system must employ a mechanism for ensuring that only one processor has access to the shared resource at any given time while blocking access to the remaining processors. Often, one or more of the processors may have a greater need to access the shared bus than other processors. For example, one or more of the processors may be in the critical path of the computer system. If a processor is in the critical path of the computer system and the processor is not allowed to access the shared resource, the band pass of the entire computer system may suffer. Priority schemes allocate the use of the shared resource among the competing users to maximize the efficiency of the computer system.

Priority controller 118 performs this function. Each of the processors 112, 114 and 116 have an input ready signal which is coupled to priority controller 118 via interface 132. The input ready signal is provided by processors 112, 114 and 116 which indicate to the priority controller 118 that the corresponding processor is ready to accept input data via PBUS 120. Similarly, each of the processors 112, 114 and 116 have an output ready signal which is coupled to priority controller 118 via interface 134. The output ready signal indicates to the priority controller 118 that the corresponding processor is ready to provide data to PBUS 120. Priority controller 118 determines which processor will provide data to PBUS 120 and which processor will accept data from PBUS 120 at any given time.

Priority controller 118 provides a read signal to each of the processors 112, 114 and 116 via interface 136. The read signal indicates to a corresponding processor that it may provide data to PBUS 120 to be read by some other processor. Similarly, priority controller 118 provides a write signal to each of the processors 112, 114 and 116 via interface 138. The write signal indicates to a corresponding processor that it may receive data that is being written by some other processor to PBUS 120. Memory processor 122 operates in a similar manner. That is, memory processor 122 may assert it's input ready signal when it is ready to accept data from one of the processors. Similarly, memory processor 122 may assert it's output ready signal when it is ready to provide data to one of the processors.

Priority controller 118 also provides a write signal to memory processor 122 via interface 138. The write signal indicates to memory processor 122 when it may accept data from PBUS 120. Similarly, priority controller 118 provides a read signal to memory processor 122 via interface 136. The read signal indicates to memory processor 122 when it is to provide data to PBUS 120.

A further discussion of the priority scheme discussed herein is contained in co-pending, commonly assigned U.S. Patent Application entitled "METHOD AND APPARATUS FOR HIGH SPEED EFFICIENT BI-DIRECTIONAL COMMUNICATION BETWEEN MULTI PROCESSORS OVER A COMMON BUS" that is expressly incorporated herein by reference.

Figure 4:
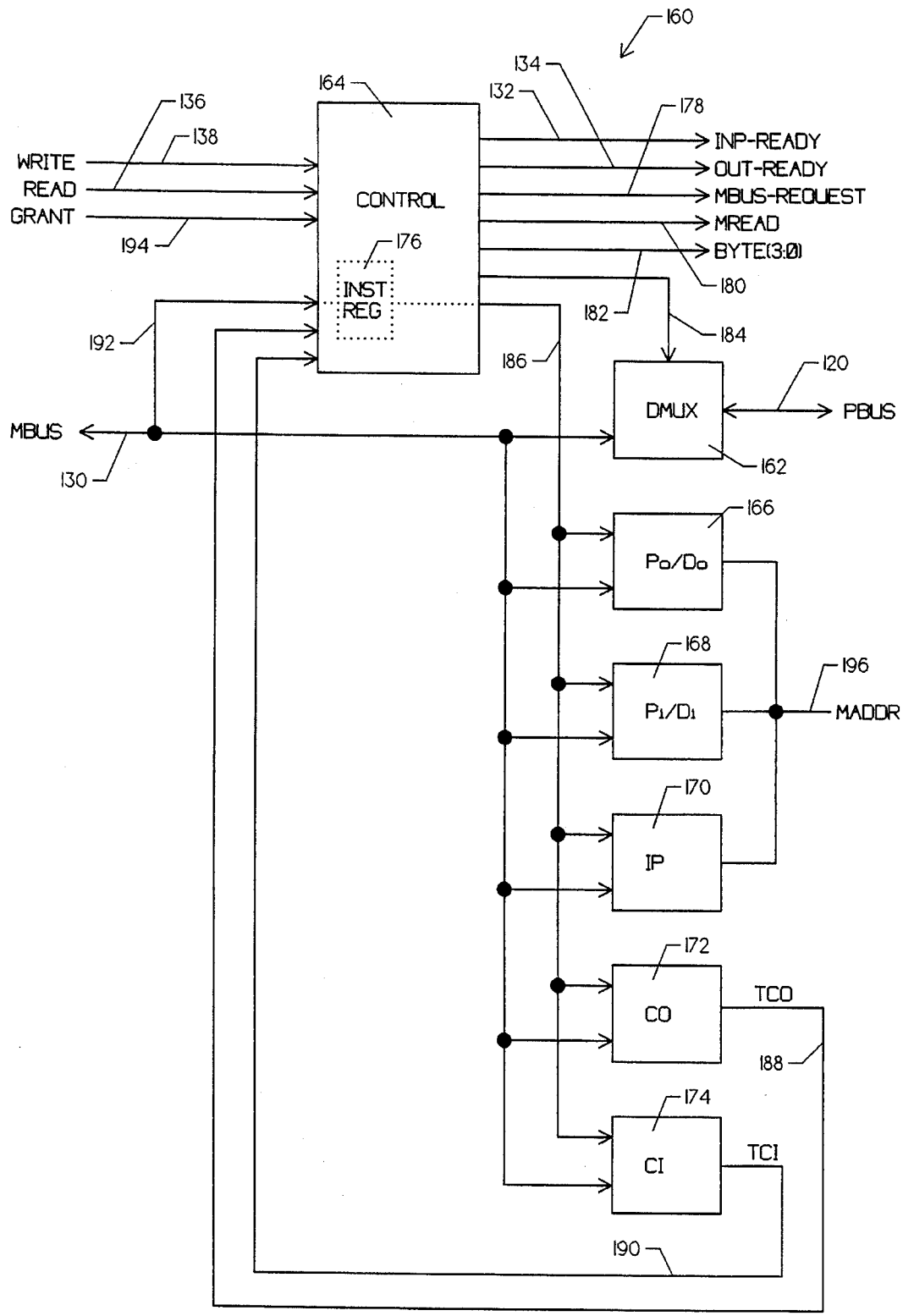
FIG. 4 is a schematic diagram illustrating an exemplary embodiment of the memory processor of the present invention.

FIG. 4 is a schematic diagram illustrating an exemplary implementation of the memory processor of FIG. 3. A DMUX block 162 is coupled to PBUS 120 and further coupled to MBUS 130. DMUX block 162 is controlled by controller 164 via interface 184. DMUX block 162 provides the necessary interface between MBUS 130 and PBUS 120. Controller 164 provides INP-ready 132, out-ready 134, MBUS-request 178, MREAD 180 and BYTE(3:0) 182. These signals provide the necessary interface to priority controller 118 and the memory element. Controller 164 receives as inputs write 138, read 136 and grant 194. These signals provide the necessary input from priority controller 118 and an MBUS controller (not shown).

DMUX block 162 is programmable and provides the formatting function of the present invention. Besides routing the data to the appropriate bytes, DMUX block 162 also provides a small amount of data buffering in each direction so that the processors 112, 114 and 116 can prefetch data from memory modules 124 and 126 prior to being needed by PBUS 120. The data buffering also allows to input data to be buffered while writing previously captured data to memory modules 124 and 126.

Controller 164 controls the actions of each of the other blocks. Encoded into a BLOCK MOVE instruction OP code are bits that define how bytes (16-bit words of 32-bit D words) within a 32-bit memory word on MBUS 130 are to be output from memory module 124 to PBUS 120 as well as a second set of bits that define how bits (16-bit words or 32-bit D words) received from PBUS 120 are to be written into memory modules 124 or 126. These bits are initialized when the instruction is fetched from memory modules 124 or 126. Each set of bits control a separate state machine which keeps track of data flow in each direction through memory processor 122. The state machines also keep track of which bits to send or receive next. Finally, the state machine keeps track of how full the data buffers are in DMUX block 162.

A PO/DO block 166 is coupled to controller 164 via interface 186 and further coupled to MBUS 130. A PI/DI block 168 is coupled to controller 164 via interface 186 and further coupled to MBUS 130. An instruction pointer block 170 is coupled to controller 164 via interface 186 and further coupled to MBUS 130.

The outputs of PO/DO 166, PI/DI 168 and instruction pointer 170 are coupled to a memory address line 196. PO/DO 166 comprises a memory pointer register PO and a memory pointer delta register DO. Memory pointer register PO points to the memory location where outgoing data is to be read. Memory pointer delta register DO provides an arbitrary offset to add to memory pointer register PO during certain operations. For example, after reading data from the address pointed to by memory pointer register PO, the contents of DO may be added to PO to be used the next time data is read from memory.

Similarly, a memory pointer register PI and a memory pointer delta register DI are included. Memory pointer register PI points to the memory location where incoming data is to be written while the processor is executing a move instruction. Memory pointer delta register DI provides an arbitrary offset to add to PI after each access to memory. Instruction pointer 170 points to the memory location that contains the next instruction for memory processor 122.

A CO register 172 is coupled to controller 164 via interface 186 and is further coupled to MBUS 130. A CI register 174 is coupled to controller 164 via interface 186 and is further coupled to MBUS 130. CO register 172 counts how many items (either bytes, words or 32-bit D words) were output to PBUS 120. CI register 174 counts how many items were input from PBUS 120. These registers can only decrement and therefore must be loaded with predetermined values at the beginning of each block move instruction. Each counter, then counts down to zero wherein it generates a terminal count signal. CO register 172 generates a TCO signal which is provided to controller 164 via interface 188. Similarly, CI register 174 generates a TCI signal which is provided to controller 164 via interface 190.

Memory processor 122 may execute a variety of instructions. To initiate an instruction, the value contained in the instruction pointer 170 is provided to a memory module 124 via interface 196. Memory module 124 (or memory module 126) then provides the corresponding instruction to memory processor 122 via MBUS 130. The instruction is also provided to controller 164 via interface 192. In an exemplary embodiment, controller 164 may have an instruction register 176 for capturing the instruction provided on MBUS 130. Encoded in the instruction are control bits for controlling the various blocks within memory processor 122. The instruction is also provided to PO/DO 166, PI/DI 168, instruction pointer 170, CO 172 and CI 174. In a preferred embodiment of the present invention, memory processor 122 supports a variety of instructions including instruction fetching instructions, loading of instruction parameters from main memory, jump instructions, etc.

Two additional instructions which are particularly applicable to the present invention, include the block move instruction and the memory-to-memory move instruction. In a block move instruction, any of the processors 112, 114 and 116 may request to read a block of data from memory. Memory processor 122 may then supply the requested block of data to the requesting processor. That is, memory processor 122 may read the data from the memory element, format the data in accordance with the desired format, and provide the result to the requesting processor.

Similarly, any of the processors 112, 114 or 116 may request to write a block of data to the memory element. It is contemplated that memory processor 122 may have independent read and write access ports such that a block read and a block write instruction may be performed simultaneously. One application for this capability is for a processor to perform a block read and then process the information as it is provided by memory processor 122. The processor may then supply the resulting data to memory processor 122 as a block write operation thereby storing the result back into memory. This eliminates the need for the processor to store the data therein. During both the block read and the block write, the memory processor may format the data as desired.

The memory-to-memory transfer instruction allows memory processor 122 to read a block of data from memory, format the data and then write the resulting data back into memory. The resulting data may be written back into the same address location as the data was read or into a different address location. This instruction may allow efficient memory to memory transfers.

Figure 5:
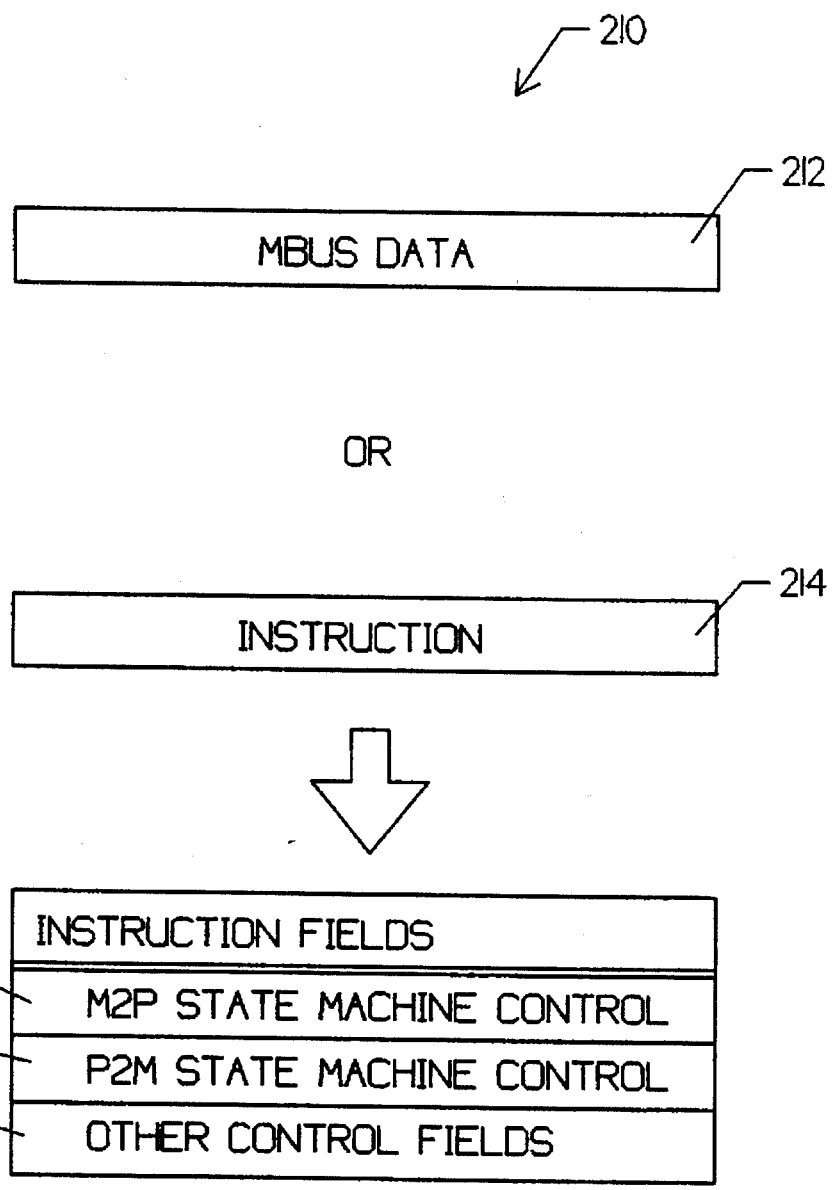
FIG. 5 is a diagram illustrating an exemplary format for the data contained in the MBUS.

FIG. 5 is a diagram illustrating an exemplary format for the data provided on MBUS 130 and is generally shown at 210. During a block move or memory-to-memory move operation, MBUS 130 may contain MBUS data as shown at 212. However, when memory processor 122 is fetching instructions or instruction parameters from main memory, MBUS 130 may contain an instruction as shown at 214. In a preferred embodiment of the present invention, various instruction fields are contemplated.

M2P state machine control field 222 comprises various control bits for controlling the MBUS to PBUS state machine. Similarly, P2M state machine control field 224 comprises various bits to control the PBUS to MBUS state machine. The operation of the M2P and P2M state machines is described further herein. Finally, other control fields 226 provide additional control signals to memory processor 122.

As shown in FIG. 4, control 164 may have an instruction register 176. An instruction on MBUS 130 may be latched into instruction register 176. Instruction register 176 may be a register, register file, RAM, or any other memory storage means. Control 164 may further have additional decode circuitry to provide decoded signals from the instruction stored in instruction register 176. In a preferred embodiment of the present invention, a state machine is included in control 164 which may decode predetermined instruction bits into various control fields including an FN-address field, an FN-data field, and an FN-operation field.

The FN-address field may comprise two bits that may be used by P0/D0 166, PI/DI 168, and instruction pointer 170 (see FIG. 4). These two control bits may indicate when these blocks are to actively drive the memory address bus (MADDR) 196. In a preferred embodiment, a 00 indicates that nothing should drive the memory address bus 196, a 01 indicates the P0/D0 166 should drive the memory address bus 196, a 10 indicates PI/DI 168 should drives the memory address bus 196, and a 11 indicates instruction processor 170 should drive the memory address bus 196. The instruction register 176 may thus command the various blocks to drive the address bus depending on what instruction the processor is executing. For example, when the processor is fetching instructions or instruction parameters from main memory, the instruction register 176 may command the instruction pointer 170 to drive the memory address bus 196. If memory processor 122 is executing a block move instruction, the instruction register 176 may command the P0/D0 166 block to drive the memory address 196, but only when memory processor 122 needs to read data from memory. The instruction processor 176 may command the PI/DI block 168 to drive the memory address bus 196 when memory processor 122 needs to write data to memory.

The FN-data field may be provided to P0/D0 166, PI/DI 168, instruction pointer 170, CO 172, and CI 174. FN-data may operate in a similar to FN-address but it may command the various blocks to receive information from MBUS 130. This is necessary to perform various instructions including the jump instruction.

The FN-operation field is a 3-bit control bus supplied to P0/D0 166, PI/DI 168, and instruction pointer 170. In the exemplary embodiment, if bit zero of the FN-operation field is a one, the value contained in instruction pointer 170 may be incremented by one. If bit one of the FN-operation field is a one, the memory pointer delta register DO may be added to memory pointer register PO and the result may be placed in the memory pointer register PO. Similarly, if bit two of the FN-operation field is a one, memory pointer delta register DI may be added to memory pointer register PI and the result may be placed in the memory pointer register PI of block 168. In all cases, if the corresponding control bit is set to zero, no incrementing/accumulating may be performed.

Figure 6A:
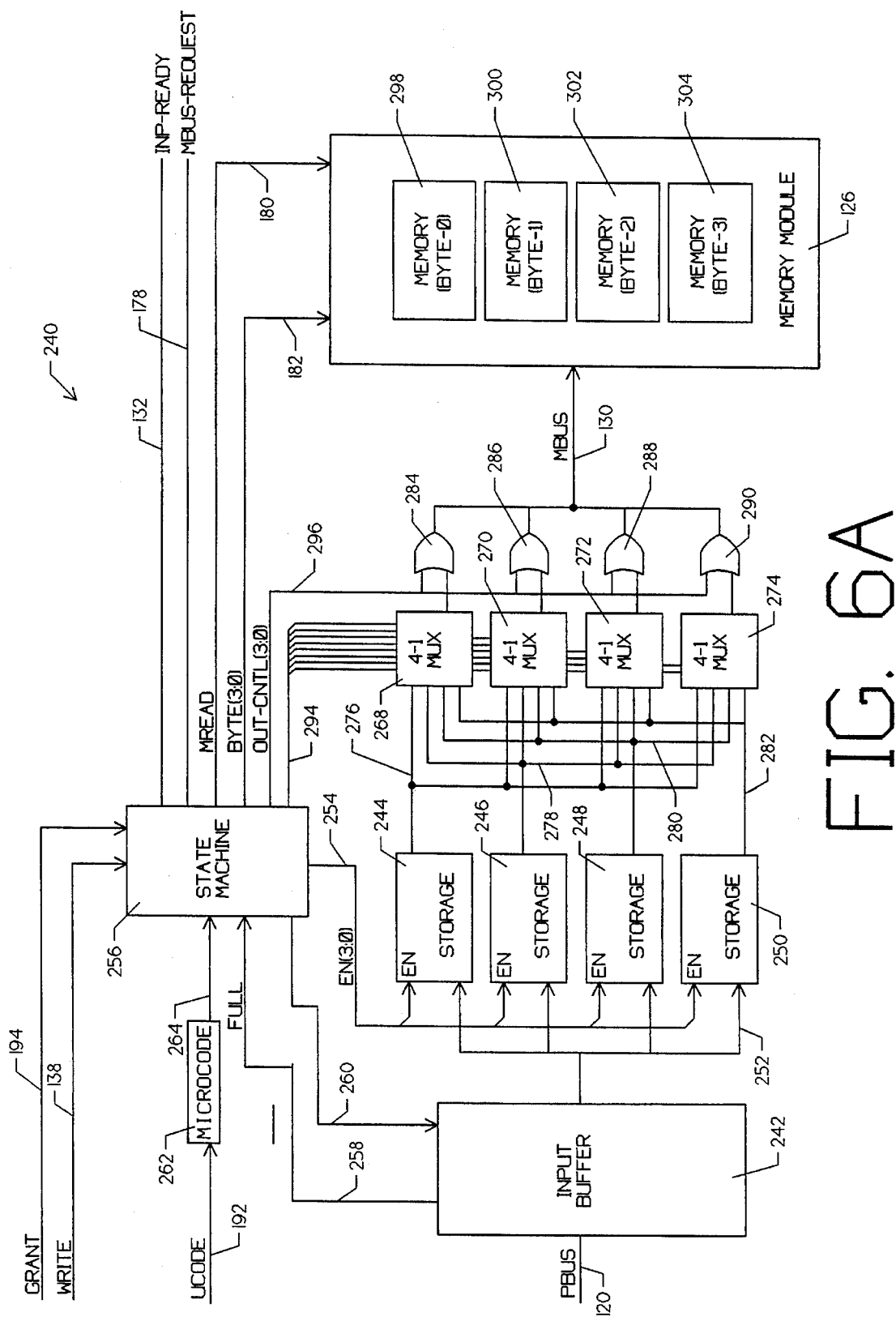
FIG. 6A is a schematic diagram of an exemplary embodiment of the PBUS to MBUS circuitry within the memory processor.

FIG. 6A is a schematic diagram of an exemplary embodiment of the PBUS to MBUS circuitry within memory processor 122. The circuitry to generally shown at 240. Data enters the apparatus on PBUS 120. An input buffer 242 is coupled to PBUS 120. Input buffer 242 is optional and may be included in the memory processor 122 such that processors 112, 114 and 116 may transmit data words to memory processor 122 before the memory processor has gained control of MBUS 130. This eliminates the need for processors 112, 114 and 116 to maintain control of PBUS 120 for an unnecessarily long period of time while waiting for data to stored in memory modules 124 or 126. That is, input buffer 242 may act as a data cache between PBUS 120 and MBUS 130. It is further contemplated that input buffer 242 may be configured such that a predetermined number of data words from PBUS 120 may be stored therein and made available to memory processor 122. That is, input buffer 242 may store the current data word plus the last "N" data words. Hence, not only may bytes from a single data word be formatted pursuant to the formatting function described above, but bytes from different data words may be used therein. For example, a memory word may be defined as the most significant bit of the previous four data words. This formatting function may be especially useful in image processing applications. Input buffer 242 provides a "full" signal to a state machine 256 via interface 258. The "full" signal is asserted when input buffer 242 is full and therefore cannot accept any more data from PBUS 120. Input buffer 242 may be controlled by state machine 256 via interface 260.

Storage elements 244, 246, 248 and 250 are coupled to input buffer 242 via interface 252. State machine 256 provides a separate enable signal to each of the storage elements 244, 246, 248 and 250 via interface 254. Since in the preferred embodiment, PBUS 120 is one-half the width of MBUS 130, two bus cycles of PBUS 120 are required to provide the data for one cycle of MBUS 130. Consistent therewith, during the first cycle of PBUS 120 a first byte and a second byte of data are placed in storage elements 244 and 246, respectively. State machine 256 enables storage element 244 and 246 during the first bus cycle of PBUS 120. During the second bus cycle of PBUS 120, a third data byte and a fourth data byte are stored in storage elements 248 and 250, respectively. State machine 256 disables storage element 244 and 246 during the second cycle of PBUS 120 while enabling storage element 248 and storage element 250.

4-1 MUX 268 has four inputs wherein each input is coupled to a corresponding one of storage elements 244, 246, 248 and 250. 4-1 4-1 MUX 270 has four inputs wherein each input is coupled to a corresponding one of storage elements 244, 246, 248 and 250. MUX 272 has four inputs wherein each input is coupled to a corresponding one of storage elements 244, 246, 248, 250. Finally, 4-1 MUX 274 has four inputs wherein each input is coupled to a corresponding one of storage elements 244, 246, 248, and 250. 4-1 MUX blocks 268, 270, 272, and 274 are controlled by state machine 256 via interface 294. In this configuration, each of the 4-1 MUX blocks 268, 270, 272, and 274 may independently select any of the data bytes contained in storage elements 244, 246, 248, and 250. 4-1 MUX blocks 268, 270, 272, and 274 are coupled to or-gates 284, 286, 288, and 290, respectively. The outputs of or-gates 284, 286, 288, and 290 are coupled to MBUS 130. The second inputs of or-gates 284, 286, 288, and 290 are independently controlled by state machine 256 via interface 296. This allows state machine 256 to control which bytes will be placed on MBUS 130.

A memory module 126 is coupled to MBUS 130. Memory module 126 may comprise memory elements 298, 300, 302, and 304. Memory element 298 may store a first byte of a memory word contained on MBUS 130. Memory element 300 may store a second byte of a memory word contained on MBUS 130. Memory element 302 may store a third byte of a memory word contained on MBUS 130. Finally, a memory element 304 may store a fourth byte of a memory word contained on MBUS 130. State machine 256 controls whether memory module 126 is in a read mode or a write mode via interface 180. State machine 256 controls which of the memory elements 298, 300, 302, and 304 are enabled at any given time via interface 182.

State machine 256 receives a write signal from priority controller 118 via interface 138. State machine 256 further receives microcode control bits via interface 264. State machine 256 provides an INP-ready signal to priority controller 118 via interface 132. State machine 256 also provides an MBUS-request signal via interface 178.

4-1 MUX blocks 268, 270, 272, and 274 provide the required formatting functions. For the formats that do not write to all of the bytes of a memory location, state machine 256 enables only those memory elements blocks 298, 300, 302, and 304 that are to be written. Conventional schemes typically required that the previous data be read from the memory location, then the previous data was masked out and the new data bits placed therein, and finally the resulting memory word was then written back into the memory location. Even assuming no overhead for the masking operation, the two memory accesses of the conventional schemes double the amount of memory band with consumed over the present invention.

The memory controller of the present invention is very efficient. Different data formats are simply different initial conditions input to state machine 256. No additional overhead from memory processor 122 is required. State machine 256 keeps track of which bits are to be written to memory. For those data formats that do not write to all 32-bits of memory (for example, writing to only one byte) this allows memory processor 122 to only write to specific bits of a particular memory location.

State machine 256 keeps track of how full the D-MUX block 162 is for data moving from PBUS.120 to MBUS 130. For example, for each byte received from PBUS 120, state machine 256 will add one to it's accumulator. Once four bits have been received, state machine 256 indicates that an entire memory address worth of data is ready to be written to memory module 126. When the data is written to memory module 126 via MBUS 130, the state machine 256 subtracts four from its count of how many bytes are in D-MUX 162.

State machine 256 also generates an INP-ready signal 132 which indicates the availability of the D-MUX block 162 to receive data. State machine 256 receives as input a write control signal via interface 138 which indicates when data has been written to D-MUX 162. The design of memory processor 122 and priority control 118 is such that state machine 256 cannot receive a write if it is currently indicating that it is not ready for input.

Figure 6B:
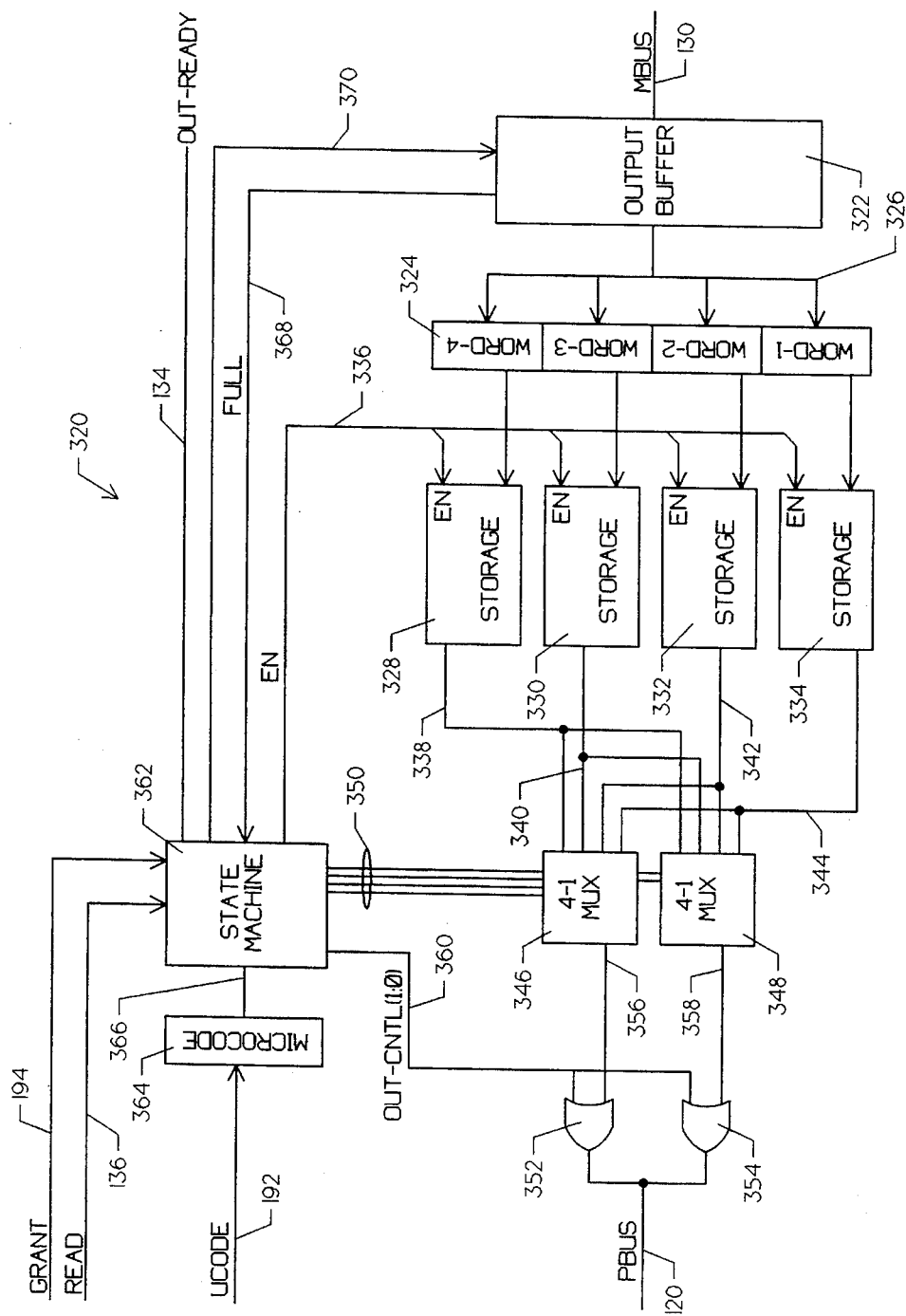
FIG. 6B is a schematic diagram of an exemplary embodiment of the MBUS to PBUS circuitry within the memory processor.

FIG. 6B is a schematic diagram of an exemplary embodiment of the MBUS to PBUS circuitry within the memory processor. Data is received on MBUS 130 from memory module 126. Output buffer 322 is coupled to MBUS 130 and may store data therein. Output buffer 322 is optional and may be included in memory processor 122 such that the memory elements may transmit memory words across MBUS 130 to memory processor 122 before memory processor 122 has gained control of PBUS 120. This eliminates the need for memory module 126 to maintain control of MBUS 130 for an unnecessarily long period of time while waiting for the data to be read by processors 112, 114 or 116. That is, output buffer 322 may act as a data cache between MBUS 130 and PBUS 120. It is further contemplated that output buffer 322 may be configured such that the current data word and also the last "N" data words may be stored therein. This configuration may allow bytes from different data words to be formatted together. For example, a memory word may be defined as the most significant byte of the previous four data words. This formatting function may be especially useful in imaging processing applications.

Output buffer 322 may provide a "full" signal to a state machine 362 via interface 368. The full signal provided by output buffer 322 indicates to state machine 362 that output buffer 322 is full and may not accept anymore data. State machine 362 may control the operation of output buffer 322 via interface 370.

In a preferred embodiment of the present invention, MBUS 130 may comprise a 32-bit data word. The 32-bit data word may comprise four 8-bit data words as shown at 324. Word-1, word-2, word-3, and word-4 of the 32-bit data word contained on MBUS 130 are feed into storage elements 334, 332, 330, and 328, respectively. Storage elements 328, 330, 332, and 334 are enabled by state machine 362 via interface 336. 4-1 MUX 364 has four inputs wherein each output is coupled to a corresponding one of storage elements 328, 330, 332, and 334. Similarly, 4-1 MUX 348 has four inputs wherein each input is coupled to a corresponding one of storage elements 328, 330, 332, and 334. 4-1 MUX 346 and 4-1 MUX 348 are controlled by state machine 362 via interface 350.

A or-gate 352 is coupled to 4-1 MUX 346 via interface 356. A or-gate buffer 354 is coupled to 4-1 MUX 348 via interface 358. The outputs of or-gates 352 and 354 are coupled to PBUS 120. The second input of or-gates 352 and 354 are coupled to state machine 362 via interface 360. That is, state machine 362 independently controls which bytes of data are exported to PBUS 120.

Since MBUS 130 is twice as wide as PBUS 120 in the preferred embodiment, one bus cycle of MBUS 130 provides the required data for two bus cycles of PBUS 120. During the first bus cycle of PBUS 120, state machine 362 provides control signals via interface 350 such that 4-1 MUX 346 and 4-1 MUX 348 select a first and second word to be output on PBUS 120. Similarly, during the second bus cycle of PBUS 120, state machine 362 provides control signals via interface 350 such that 4-1 MUX 346 and 4-1 MUX 348 select a second and third word to provide to PBUS 120.

State machine 362 receives microcode as input via interface 366 from the instruction. State machine 362 also keeps track of how full the D-MUX block is for data moving from MBUS 130 to PBUS 120. For example, for each word received via MBUS 130, state machine 362 adds four to its accumulator. As bytes are removed from D-MUX 162, as indicated by the read signal 136, the accumulator subtracts two because two bytes are provided to PBUS 120 during each bus cycle.

State machine 362 generates an OUT-ready signal 134 which indicates whether D-MUX 162 is ready to send data to PBUS 120. State machine 362 receives as a read signal as input from priority control 118 via interface 136. The read signal indicates when data has been read from D-MUX 162. The design of memory processor 122 and priority control 118 is such that state machine 362 cannot receive a read signal if D-MUX is not ready to provide output.

Figure 7A:
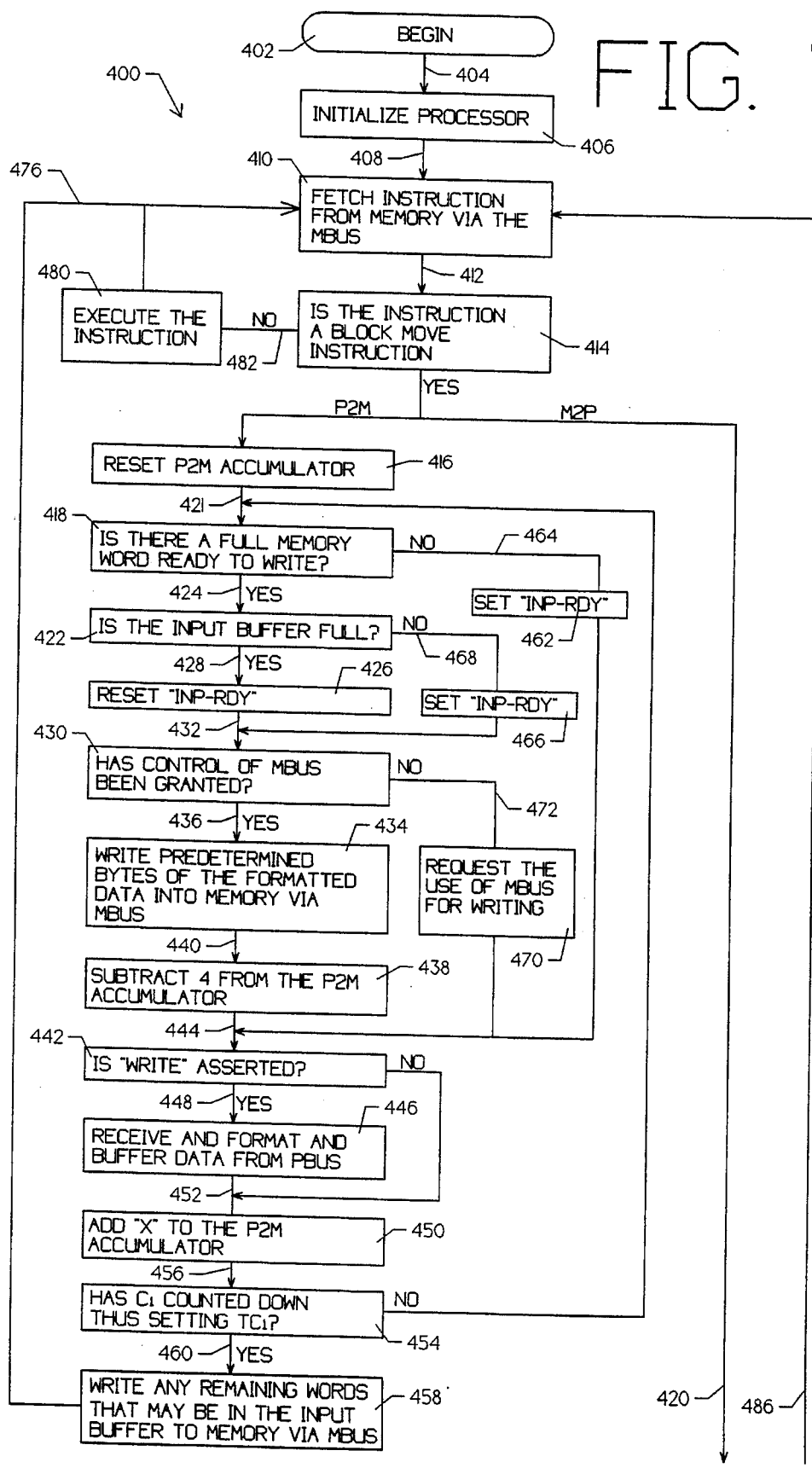
FIG. 7A and FIG. 7B comprise a flow diagram illustrating the operation of an exemplary embodiment of the present invention.

FIG. 7A is a flow diagram illustrating the exemplary embodiment of the present invention. The algorithm is entered at element 402. Control is passed to element 406 via interface 404. Element 404 initializes memory processor 122. Control is then passed to element 410 via interface 408. Element 410 fetches an instruction from memory via MBUS 130. Element 414 determines whether the instruction fetched by element 410 is a block move instruction. If the instruction is not a block move instruction, control is passed to element 480 via interface 482. Element 480 executes the instruction fetched in element 410 and passes control back to element 410 via interface 476.

Referring back to element 414, if the instruction fetched in element 410 is a block move instruction, control is passed to element 416 and element 500 via interface 420. Element 416 resets a P2M accumulator. Control is then passed to element 418 via interface 421. Element 418 determines whether there is a full memory word ready to write to memory module 126. If there is a full memory word ready to write to memory module 126, control is passed to element 422 via interface 424. Element 422 determines whether input buffer 242 is full. If input buffer 242 is full, control is passed to element 426 via interface 428. Element 426 resets INP-RDY 132. Control is then passes to element 430 via interface 432.

Referring back to element 422, if input buffer 242 is not full, control is passed to element 466 via interface 468. Element 466 sets INP-RDY 132. Control is then passed to element 430 via interface 432. Element 430 determines whether control of MBUS 130 has been granted. If control of MBUS 130 has been granted, control is passed to element 434 via interface 436. Element 434 writes predetermined bytes of the formatted data into memory module 126 via MBUS 130. Control is then passed to element 438 via interface 440. Element 438 subtracts 4 from the P2M accumulator. Element 438 assumes 4 bytes have been written to memory module 126 via interface 130 in element 434. It is contemplated that any predetermined number of bytes may be written to memory by element 434 thereby causing element 438 to subtract the predetermined number of bytes from the P2M accumulator. Control is then passed to element 442 via interface 444.

Referring back to element 430, if control of MBUS 130 has not been granted, control is passed to element 470 via interface 472. Element 470 requests the use of MBUS for writing. Control is then passed to element 442 via interface 444. Referring back to element 418, if a full memory word is not ready to write, control is passed to element 462 via interface 464. Element 462 sets INP-RDY 132. Control is then passed to element 442 via interface 444.

Element 442 determines whether write 138 is asserted. If write 138 is asserted, control is passed to element 446 via interface 448. Element 446 receives and formats data from PBUS 120. Element 446 also buffers the data received using input buffer 242. Control is then passed to element 450 via interface 452. Referring back to element 442, if write 138 has not been asserted, control is passed to element 450 via interface 452. Element 450 adds "X" to the P2M accumulator, where "X" is "1" if bytes are being input from PBUS 120, "2" if words are being input from PBUS 120, or "4" if 32 byte Dwords are being input from PBUS 120. Control is then passed to element 454 via interface 456. Element 454 determines whether CI 174 (see FIG. 4) has counted down to zero, thereby setting TCI 190. If CI 174 has set TCI 190, control is passed to element 458 via interface 460. Element 458 writes any remaining words that may be in input buffer 242 into memory module 126 via MBUS 130. Control is then passed back to element 410 via interface 476. Element 410 fetches another instruction from memory via MBUS 130. Referring back to element 454, if CI 174 has not counted down to zero and thus not set TCI 190, control is passed back to element 418 via interface 421.

Figure 7B:
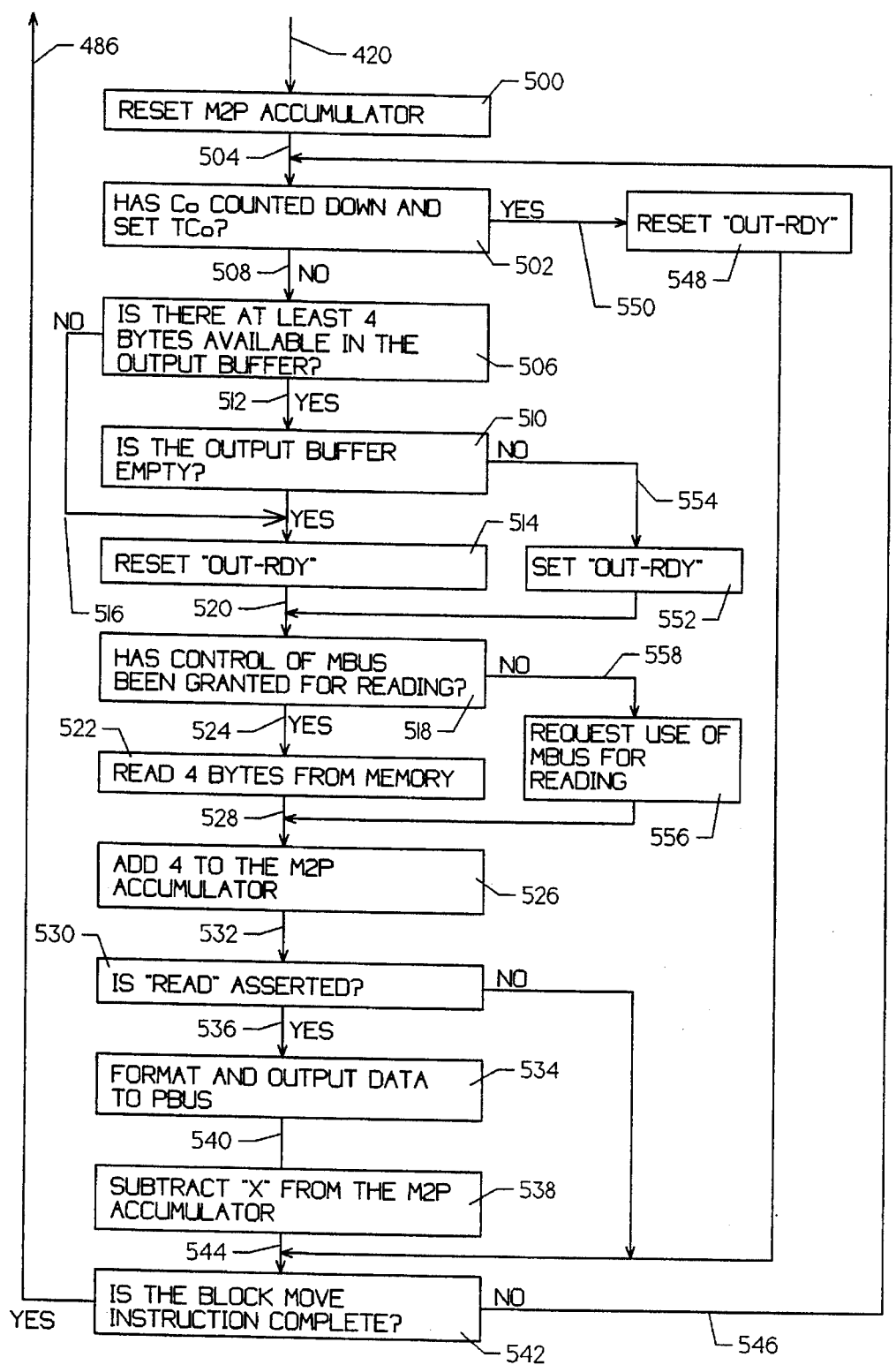

Referring back to element 414, if the instruction is a block move instruction, control is passed to element 500 via interface 420 (see FIG. 7B). Element 500 resets the M2P accumulator contained in state machine 362. Control is then passed to element 502 via interface 504. Element 502 determines whether CO 172 has counted down to zero, thereby setting TCO 188. If CO 172 has not counted down to zero, control is passed to element 506 via interface 508. Element 506 determines whether there is at least four bytes of data available in output buffer 322. If there is at least four bytes data available in output buffer 322, control is passed to element 510 via interface 512. Element 510 determines whether output buffer 322 is empty. If output buffer 322 is empty, control is passed to block 514 via interface 516. Element 514 resets OUT-RDY 134.

Referring back to element 506, if there is not at least four bytes of data available in output buffer 322, control is passed to element 514 via interface 516. As stated above, element 514 resets OUT-RDY 134. Control is passed from element 514 to element 518 via interface 520. Element 518 determines whether control of MBUS 130 has been granted for reading. If control of MBUS has been granted for reading, control is passed to element 522 via interface 524. Element 522 reads four bytes of data from memory module 126. Control is then passed to element 526 via interface 528. Element 526 adds four to the M2P accumulator in state machine 362. Control is then passed to element 530 via interface 532. Element 530 determines whether read 136 is asserted. If read 136 is asserted, control is passed to element 534 via interface 536. Element 534 formats data and provides the result to PBUS 120. Control is then passed to element 538 via interface 540. Element 538 subtracts "X" from the M2P accumulator, where X is "1" if bytes are being output to PBUS, "2" if words are being output to PBUS 120, and "4" if 32 byte Dwords are being output to PBUS 120. Control is then passed to element 542 via interface 544. Element 542 determines whether the block move instruction is complete. If the block move instruction is complete, control is passed back to element 410 via interface 486. Element 410 fetches another instruction from memory via the MBUS 130. If the block move instruction is complete, control is passed back to element 502 via interface 546.

Referring back to element 502, if CO 172 has not counted down to zero, control is passed to element 548 via interface 550. Element 548 resets OUT-RDY 134 and passes control to element 542 via interface 544.

Referring back to element 510, if output buffer 322 is not empty, control is passed to element 552 via interface 554. Element 552 sets OUT-RDY 134 and passes control to element 518.

Referring back to element 518, if control of MBUS 130 has not been granted for reading, control is passed to element 556 via interface 558. Element 556 requests the use of MBUS 134 reading. Control is then passed to element 526 via interface 528. Finally, referring back to element 530, if read 136 is not asserted, control is passed to element 542 via interface 544.

Having thus described the preferred embodiments of the present invention, those of skill in the art will readily appreciate that the teachings found herein may be applied to yet other embodiments within the scope of the claims hereto attached.

I claim:

1. In a data processing system having a first bus wherein the first bus has a first bus width, the first bus for sequentially transmitting a plurality of first data packets wherein the plurality of first data packets have a first data width, the data processing system further having a second bus wherein the second bus has a second width, the second bus for sequentially transmitting a plurality of second data packets wherein the plurality of second data packets have a second data width, the width of the first bus being less than the width of the second bus, the improvement comprising:

a. first programmable formatting means coupled to the first bus and further coupled to the second bus for formatting the plurality of first data packets into a plurality of groups, said first programmable formatting means assembling the plurality of first data packets into the plurality of groups as the plurality of first data packets are sequentially transmitted over the first bus, each of the plurality of groups forming a corresponding one of the plurality of second data packets for sequential transmission over the second bus; and b. first control means coupled to said first programmable formatting means for controlling which of the plurality of first data packets are assembled into each of the plurality of groups.

2. An improvement according to claim 1 wherein the first bus operates at a higher frequency than the second bus.

3. An improvement according to claim 2 wherein the first bus operates at twice the frequency of the second bus.

4. An improvement according to claim 3 wherein the width of the second bus is twice as wide as the width of the first bus.

5. An improvement according to claim 4 wherein said first control means sequentially receives two first data packets from the first bus during two successive bus cycles of the first bus before said first formatting means assembles the two first data packets into a group, the result being transmitted over the second bus on a next succeeding bus cycle of the second bus.

6. An improvement according to claim 1 wherein each of the plurality of first data packets comprises a plurality of first sub-packets.

7. An improvement according to claim 6 wherein each of the plurality of first sub-packets comprises a word.

8. An improvement according to claim 6 wherein each of the plurality of second data packets comprises a plurality of second sub-packets and wherein each of the plurality second sub-packets comprises a byte.

9. An improvement according to claim 6 wherein each of the plurality of first data packets comprises a MSB sub-packet and an LSB sub-packet.

10. An improvement according to claim 7 wherein each of the plurality of second data packets comprises a plurality of second sub-packets.

11. An improvement according to claim 10 wherein each of the plurality of second sub-packets comprises a word.

12. An improvement according to claim 10 wherein each of the plurality of second sub-packets comprises a byte.

13. An improvement according to claim 11 wherein each of the plurality of first data packets comprises a MSB sub-packet and an LSB sub-packet.

14. An improvement according to claim 10 wherein said first control means further controls which of the plurality of sub-packets of each of said plurality of first data packets are assembled into each of the plurality of groups.

15. An improvement according to claim 12 wherein said first control means is instruction programmable, said instruction having control bits for programmable control such that a predetermined number of the plurality of sub-packets of the plurality of first data packets may be assembled together by said first formatting means to form one of the plurality of groups.

16. An improvement according to claim 15 wherein said first control means is further programmable such that the plurality of sub-packets of the plurality of first data packets may be assembled together in an order from the MSB sub-packet to the LSB sub-packet.

17. An improvement according to claim 16 wherein said first control means is further programmable such that the plurality of sub-packets of the plurality of first data packets may be assembled together in an order from the LSB sub-packet to the MSB sub-packet.

18. An improvement according to claim 14 wherein said first control means is instruction programmable, such instruction having control bits for programmable control such that any predetermined one of the plurality of sub-packets the plurality of first data packets may be assembled together with any other predetermined one of the plurality of sub-packets the plurality of first data packets to form one of the plurality of groups.

19. An improvement according to claim 1 further comprising a memory wherein the memory is coupled to the second bus, the first control means further being instruction programmable, said instruction having control bits for controlling which of the plurality of first data packets are assembled into each of the plurality groups.

20. An improvement according to claim 18 further comprising a processor wherein the processor is coupled to the first bus.

21. An improvement according to claim 20 wherein said first control means is further programmable such that the processor may send a block of data from the processor to the memory, said first formatting means formatting the block of data as the block of data is sequentially transferred.

22. An improvement according to claim 21 wherein said first control means is further programmable such that the processor may receive a block of data from the memory, said first formatting means formatting the block of data as the block of data is sequentially transferred.

23. An improvement according to claim 22 wherein said first control means is further programmable such that the memory may send a block of data from the memory to said first formatting means, said first formatting means formatting the block of data and sending the block of data back to the memory.

24. An improvement according to claim 20 wherein the memory comprises a plurality of memory devices wherein each of the plurality of memory devices is coupled to a corresponding one of the plurality of sub-packet of the plurality of second data packets and wherein the corresponding one of the plurality of memory device stores the corresponding one of the plurality of sub-packets.

25. An improvement according to claim 24 wherein each of the plurality of memory devices has contents and are separately enabled such that the corresponding one of the plurality of sub-packets of the plurality of second data packets that is coupled to the corresponding one of the plurality of memory devices is stored in the corresponding one of the plurality of memory devices without disturbing the contents of the other of the plurality of memory devices.

26. An improvement according to claim 1 further comprising:
   c. second formatting means coupled to the first bus and further coupled to the second bus for formatting a plurality of second data packets, said second formatting means disassembling the plurality of second data packets into a plurality of first data packets as the plurality of second data packets are sequentially transmitted over the second bus, each of the plurality of first data packets being sequential transmitted over the first bus; and
   d. second control means coupled to said second formatting means for controlling which of the plurality of second data packets are disassembled into each of the plurality of first data packets.

27. An improvement according to claim 26 wherein the first bus operates at a higher frequency than the second bus.

28. An improvement according to claim 27 wherein the first bus operates at twice the frequency of the second bus.

29. An improvement according to claim 28 wherein the width of the second bus is twice as wide as the width of the first bus.

30. An improvement according to claim 29 wherein said second control means sequentially receives one second data packets from the second bus during one successive bus cycles of the second bus, then said second formatting means disassembles the one second data packet and produces two first data packets, the resulting two first data packets being transmitted over the first bus on the next succeeding two bus cycle of the first bus.

31. A data processing system having a first bus wherein the first bus has a first bus width, the first bus for sequentially transmitting a plurality of first data packets wherein the plurality of first data packets have a first data width, the data processing system further having a second bus wherein the second bus has a second width, the second bus for sequentially transmitting a plurality of second data packets wherein the plurality of second data packets have a second data width, the width of the first bus being less than the width of the second bus, comprising:
   a. a memory processor coupled to the first bus and further coupled to the second bus for programming one of a plurality of formatting functions and formatting the plurality of first data packets into a plurality of groups, said memory processor assembling the plurality of first data packets into the plurality of groups as the plurality of first data packets are sequentially transmitted over the first bus, each of the plurality of groups forming a corresponding one of the plurality of second data packets for sequential transmission over the second bus; the memory processor further controlling which of the plurality of first data packets are assembled into each of the plurality of groups.

32. A data processing system according to claim 31 wherein the first bus operates at a higher frequency than the second bus.

33. A data processing system according to claim 32 wherein the first bus operates at twice the frequency of the second bus.

34. A data processing system according to claim 33 wherein the width of the second bus is twice as wide as the width of the first bus.

35. A data processing system according to claim 34 wherein said memory processor sequentially receives two first data packets from the first bus during two successive bus cycles of the first bus before said memory processor assembles the two first data packets into a group, the resulting group being transmitted over the second bus on a next succeeding bus cycle of the second bus.

36. A data processing system according to claim 31 wherein each of the plurality of first data packets comprises a plurality of first sub-packets.

37. A data processing system according to claim 35 wherein each of the plurality of first sub-packets comprises a word.

38. A data processing system according to claim 36 wherein each of the plurality of second data packets comprises a plurality of second sub-packets and wherein each of the plurality of second sub-packets comprises a byte.

39. A data processing system according to claim 37 wherein each of the plurality of first data packets comprises a MSB sub-packet and an LSB sub-packet.

40. A data processing system according to claim 37 wherein each of the plurality of second data packets comprises a plurality of second sub-packets.

41. A data processing system according to claim 40 wherein each of the plurality of second sub-packets comprises a word.

42. A data processing system according to claim 40 wherein each of the plurality of second sub-packets comprises a byte.

43. A data processing system according to claim 41 wherein each of the plurality of first data packets comprises a MSB sub-packet and an LSB sub-packet.

44. A data processing system according to claim 40 wherein said memory processor further controls which of the plurality of sub-packets of each of said plurality of first data packets are assembled into each of the plurality of groups.

45. A data processing system according to claim 43 wherein said memory processor is instruction programmable, said instruction having control bits for programmable control such that a predetermined number of the plurality of sub-packets of the plurality of first data packets may be assembled together by said formatting means to form one of the plurality of groups.

46. A data processing system according to claim 45 wherein said memory processor is further programmable such that the plurality of sub-packets of the plurality of first data packets may be assembled together in an order from the MSB sub-packet to the LSB sub-packet.

47. A data processing system according to claim 46 wherein said memory processor is further programmable such that the plurality of sub-packets of the plurality of first data packets may be assembled together in an order from the LSB sub-packet to the MSB sub-packet.

48. A data processing system according to claim 44 wherein said memory processor is instruction programmable, said instruction having control bits for programmable control such that any predetermined one of the plurality of sub-packets of the plurality of first data packets may be assembled together with any other predetermined one of the plurality of sub-packets of the plurality of fist data packets to form one of the plurality of groups.

49. A data processing system according to claim 36 further comprising a memory wherein the memory is coupled to the second bus, the memory processor further being instruction programmable, said instruction having control bits for controlling which of the plurality of first data packets are assembled into each of the plurality of groups.

50. A data processing system according to claim 49 further comprising a processor wherein the processor is coupled to the first bus.

51. A data processing system according to claim 50 wherein said memory processor is further programmable such that the processor may send a block of data from the processor to the memory, said memory processor formatting the block of data as the block of data is sequentially transferred.

52. A data processing system according to claim 51 wherein said memory processor is further programmable such that the processor may receive a block of data from the memory, said memory processor formatting the block of data as the block of data is sequentially transferred.

53. A data processing system according to claim 52 wherein said memory processor is further programmable such that the memory may send a block of data from the memory to said memory processor, said memory processor formatting the block of data and sending the block of data back to the memory.

54. A data processing system according to claim 50 wherein the memory comprises a plurality of memory devices wherein each one of the plurality of memory devices is coupled to a corresponding one of the plurality of sub-packet of the plurality of second data packets and wherein the corresponding one of the plurality of memory device stores the corresponding one of the plurality of sub-packets.

55. A data processing system according to claim 54 wherein each of the plurality of memory devices has contents and are separately enabled such that the corresponding one of the plurality of sub-packets of the plurality of second data packets that is coupled to the corresponding one of the plurality of memory devices is stored in the corresponding one of the plurality of memory devices without disturbing the contents of the other of the plurality of memory devices.

56. A data processing system according to claim 31 wherein the memory processor further formats a plurality of second data packets, said memory processor disassembling the plurality of second data packets into a plurality of first data packets as the plurality of second data packets are sequentially transmitted over the second bus, each of the plurality of first data packets being sequential transmitted over the first bus; said memory processor further controlling which of the plurality of second data packets are disassembled into each of the plurality of first data packets.

57. A data processing system according to claim 56 wherein the first bus operates at a higher frequency than the second bus.

58. A data processing system according to claim 57 wherein the first bus operates at twice the frequency of the second bus.

59. A data processing system according to claim 58 wherein the width of the second bus is twice as wide as the width of the first bus.

60. A data processing system according to claim 59 wherein said memory processor sequentially receives one second data packets from the second bus during one successive bus cycles of the second bus, then said memory processor may disassemble the one second data packet and produces two first data packets, the resulting two first data packets being transmitted over the first bus on the next succeeding two bus cycle of the first bus.

61. A method for interfacing between a first bus and a second bus wherein the second bus is wider than the first bus, comprising:
 a. programming one of a plurality of formatting functions;
 b. receiving a plurality of first data packets from the first bus;
 c. formatting a predetermined number of the plurality of first data packets into a second data packet;
 d. writing the second data packet onto the second bus.

62. A method according to claim 61 wherein said formatting step further comprises:
 a. arranging the predetermined number of the plurality of first data packets such that the resulting second data packet has a predetermined width.

* * * * *

UNITED STATES PATENT AND TRADEMARK OFFICE
CERTIFICATE OF CORRECTION

PATENT NO. : 5,559,969
DATED : September 24, 1996
INVENTOR(S) : Jennings

It is certified that error appears in the above-identified patent and that said Letters Patent is hereby corrected as shown below:

Col. 20, line 52, change "such" to --said--.

Col. 20, line 55, after "packets", insert --of--.

Col. 20, line 57, after "sub-packets", insert --of--.

Col. 20, line 64, after "plurality", insert --of--.

Signed and Sealed this

Twenty-sixth Day of November 1996

Attest:

BRUCE LEHMAN

Attesting Officer

Commissioner of Patents and Trademarks